(12) United States Patent
Farina (10) Patent No.: US 11,439,158 B2
(45) Date of Patent: Sep. 13, 2022

(54) APPARATUS AND PROCESS FOR THE MANUFACTURE OF A FROZEN CONFECTION

(71) Applicant: Conopco, Inc., Englewood Cliffs, NJ (US)

(72) Inventor: Antonio Farina, Naples (IT)

(73) Assignee: Conopco, Inc., Englewood Cliffs, NJ (US)

( * ) Notice: Subject to any disclaimer, the term of this patent is extended or adjusted under 35 U.S.C. 154(b) by 844 days.

(21) Appl. No.: 15/313,613

(22) PCT Filed: May 12, 2015

(86) PCT No.: PCT/EP2015/060458
§ 371 (c)(1),
(2) Date: Nov. 23, 2016

(87) PCT Pub. No.: WO2015/180957
PCT Pub. Date: Dec. 3, 2015

(65) Prior Publication Data
US 2017/0188601 A1     Jul. 6, 2017

(30) Foreign Application Priority Data

May 30, 2014     (EP) .................................... 14170641

(51) Int. Cl.
*A23G 9/28* (2006.01)
*A23G 9/16* (2006.01)
(Continued)

(52) U.S. Cl.
CPC ............. *A23G 9/282* (2013.01); *A23G 9/163* (2013.01); *A23G 9/283* (2013.01); *A23G 9/48* (2013.01);
(Continued)

(58) Field of Classification Search
None
See application file for complete search history.

(56) References Cited

U.S. PATENT DOCUMENTS 3,014,437 A * 12/1961 Dutchess ............... A23G 9/282
366/160.1
3,405,662 A    10/1968 Otken
(Continued)

FOREIGN PATENT DOCUMENTS

CN    1171202    10/2004
CN    1612996    5/2005
(Continued)

OTHER PUBLICATIONS

Search Report in EP14170641, dated Oct. 28, 2014.
(Continued)

*Primary Examiner* — Stephanie A Cox
(74) *Attorney, Agent, or Firm* — Gerard J. McGowan, Jr.

(57) ABSTRACT

The present invention provides an apparatus for producing frozen confectionery products, the apparatus comprising a mixing chamber, the mixing chamber having: at least one frozen confection inlet connectable to a source of a frozen confection; at least one sauce inlet connectable to a source of sauce; and an outlet, wherein the at least one sauce inlet is positioned between the at least one frozen confection inlet and the outlet, characterised in that the mixing chamber is rotatable. The present invention provides a process for producing frozen confectionery products, the process comprising: providing the foregoing apparatus; supplying a frozen confection to the at least one frozen confection inlet; supplying a sauce to the at least one sauce inlet; and extruding the frozen confection and sauce from the outlet, (Continued)

characterised in that the mixing chamber is rotated thereby to distribute the sauce randomly throughout the frozen confection.

15 Claims, 7 Drawing Sheets

(51) Int. Cl.
| | |
|---|---|
| *A23G 9/48* | (2006.01) |
| *B01F 23/47* | (2022.01) |
| *B01F 23/451* | (2022.01) |
| *B01F 35/71* | (2022.01) |
| *A23G 9/50* | (2006.01) |

(52) U.S. Cl.
CPC ............ *B01F 23/451* (2022.01); *B01F 23/47* (2022.01); *B01F 35/7179* (2022.01); *A23G 9/506* (2013.01); *A23V 2002/00* (2013.01)

(56) References Cited

U.S. PATENT DOCUMENTS

| | | | |
|---|---|---|---|
| 3,408,960 A | 11/1968 | Stanley | |
| 3,477,393 A | 11/1969 | Bell | |
| 3,765,653 A | 10/1973 | Morse et al. | |
| 4,168,919 A | 9/1979 | Rosen et al. | |
| 4,590,107 A * | 5/1986 | Bridgeford | A22C 13/0013 |
| | | | 138/118.1 |
| 4,873,104 A | 10/1989 | Butcher et al. | |
| 5,135,767 A | 8/1992 | Daouse | |
| 5,283,070 A | 2/1994 | Bertrand et al. | |
| 5,603,965 A | 2/1997 | Daouse | |
| 5,692,433 A | 12/1997 | Akesson et al. | |
| 5,888,567 A * | 3/1999 | Daouse .................. | A23G 9/285 |
| | | | 425/133.1 |
| 6,193,494 B1 | 2/2001 | Daouse | |
| 7,165,878 B1 * | 1/2007 | Mimran .................... | A23G 9/22 |
| | | | 366/177.1 |
| 7,178,976 B2 * | 2/2007 | Gerber ................... | A23G 9/228 |
| | | | 366/177.1 |
| 7,665,398 B2 * | 2/2010 | Gerber ..................... | A23G 9/20 |
| | | | 366/156.1 |
| 2003/0129289 A1 | 7/2003 | Henriksen et al. | |
| 2010/0209562 A1 | 8/2010 | Henriet et al. | |
| 2011/0177209 A1 * | 7/2011 | Farina .................... | A23G 9/282 |
| | | | 426/89 |
| 2013/0045310 A1 * | 2/2013 | Ricco ....................... | A23G 9/28 |
| | | | 426/139 |

FOREIGN PATENT DOCUMENTS

| | | |
|---|---|---|
| CN | 103600417 | 2/2014 |
| DE | 19910794 | 9/2000 |
| EP | 0221757 | 10/1988 |
| EP | 0293022 | 1/1992 |
| EP | 0741972 | 11/2001 |
| EP | 1277411 | 1/2003 |
| EP | 1719413 | 11/2006 |
| GB | 107611 | 7/1917 |
| GB | 688113 | 2/1953 |
| GB | 1076117 | 7/1967 |
| GB | 1169500 | 11/1969 |
| WO | WO9831238 | 7/1998 |
| WO | WO03041513 | 5/2003 |
| WO | WO2009037221 | 3/2009 |
| WO | WO2011086058 | 7/2011 |
| WO | WO2014006068 | 1/2014 |

OTHER PUBLICATIONS

Search Report in PCTEP2015060458, dated Jul. 21, 2015.
Written Opinion in EP14170641, dated Oct. 28, 2014.
Written Opinion in PCTEP2015060458, dated Jul. 21, 2015.

* cited by examiner

APPARATUS AND PROCESS FOR THE MANUFACTURE OF A FROZEN CONFECTION

TECHNICAL FIELD OF INVENTION

The present invention relates to an apparatus and process for the manufacture of a frozen confection. In particular it relates to an apparatus and process for the manufacture of a frozen confection that contains one or more sauces (i.e. liquid-like materials such as fruit sauces, syrups, chocolate and the like) which form a random structure within the body of the product. More particularly, it relates to the manufacture of cone-based frozen confection products having such sauces in a random structure within the body of the frozen confection.

BACKGROUND TO INVENTION

Ice cream cone products, such as Cornetto™, are popular and well-known. These products typically consist of a wafer cone completely filled with ice cream on top of which sauces and/or pieces of biscuit, nut or fruit are dispensed to provide an attractive appearance. However, consumers are continually looking for new eating experiences, and conventional cone products may be perceived as somewhat old-fashioned and uninteresting. For example, they have relatively small amounts of sauce, which is typically only placed on top of the ice cream. There is a need to design ice cream products that give the consumer a more indulgent and interesting eating experience for example by having sauces incorporated throughout the ice cream.

Moreover, it is desirable to be able to provide a product in which these sauces are incorporated throughout the ice cream in a random, rippled manner which is indicative of a more artisanal, marbled, hand-made product. Such products can be achieved by carefully manually combining together a frozen confection with a sauce, for example an ice cream with molten chocolate. Such manual means allow the sauce to be incorporated within the frozen confection in a random, artisanal manner and the combined products can then be scooped carefully into a container such as a cone. However, these manual processes are time consuming and inappropriate for industrial ice cream manufacture. They are also only suitable for scooping, as opposed to extruding, and so the frozen confection will not be present throughout the body of the cone. Moreover, it is difficult to ensure that the sauce and the ice cream are combined randomly yet remain separate to provide a heterogeneous product (i.e. strips of sauce rippled through the frozen confection product), as opposed to mixing together. There have been previous attempts to produce novel product architectures but it will be seen that these are not suitable for the production of products with a random distribution of sauce. The following pieces of prior art provide products having successive layers of sauce and ice cream, however these layers are regular and well formed.

EP0293022 relates to an apparatus for creating extruded products. The products are made by feeding a first viscous product through a tube, rotationally introducing a second, different viscous product into the first one while preventing homogeneous mixing and conducting this composite stream along at least one divider arranged with one main dimension substantially in the flow direction of said stream. The resultant products are dispensed into tubs and have multiple patterns through the body of the product, each pattern being a roughly concentric or spirally striped pattern and which patterns are arranged in approximate symmetry, the resultant products therefore having a regular pattern.

U.S. Pat. No. 5,135,767 relates to a process and apparatus for the production of an ice confectionery in which superposed ribbons of ice confectionery and a crispy composition are extruded into a mold in the form of a body of revolution by means of an extrusion assembly comprising a flat extrusion tube and a spray tube. The support of the extrusion assembly receives a spinning movement resulting from a continuous horizontal rotational movement and an ascending and descending movement relative to the mold. Again, the resultant products have a regular pattern.

U.S. Pat. No. 5,283,070 discloses a layered food product made by extruding an aerated ice composition into a vertically descending helix rotating about a vertical axis and having spaced flights which define passages there between in the helix, spraying a second fat-based water-based or sugar-containing composition into passages of the extruded helix, and depositing the sprayed helix so that a layered food product having regular alternating layers of aerated ice composition and second composition is formed.

WO2011/086058 discloses an apparatus for making a frozen confectionery product by rotary vertical extrusion into a container. The apparatus comprises: a nozzle, at least one ice-cream passage with at least one inlet port and an outlet port; and at least one chocolate passage with at least an inlet port and an outlet port wherein the outlet ports are provided in the nozzle and have elongated cross-sections, and wherein the chocolate outlet port extends in parallel to the ice cream outlet port. This apparatus produces a frozen confectionery product comprising a container and an aerated frozen confection extruded into the container, wherein a plurality of substantially thin chocolate patterns are provided in the aerated frozen confection, said chocolate patterns having the form of at least one substantially helical chocolate layer extending across the complete height of the container and forming substantially annular parallel chocolate layers.

GB1169500 provides a variegator for spirally entwining at least two or more continuously flowing streams of materials, such as ice creams, flavorings or a combination thereof, in which each of the streams is introduced into the hollow interior of an elongated casing having a rotatable unit. The latter has discrete passageways for isolating and conveying the streams longitudinally of the casing. The streams are rotated with the unit about an axis in the casing and are discharged at the terminal end of the rotatable unit and are spirally entwined product, as opposed to a random one.

In GB107611, an extrusion nozzle is provided with a partition twisted in such a manner that plastic material from separate reservoirs remains separated until it issues from the orifice of the nozzle as a rotating and spirally striped product. The extrudate, which may be a combination of two differently coloured and flavoured ice creams, is collected in a mould and the nozzle is rotated to counteract the rotation of the extrudate so that a stable diagonally striped product is formed.

U.S. Pat. No. 5,603,965 discloses an apparatus for preparing an article of ice confectionery that has two tube assemblies which each have a mobile portion positioned coaxially one to the other. Each mobile portion has a distribution channel which extends to a nozzle delivery end configured in a fishtail shape for depositing material, the mobile portions being positioned and configured so that at least a portion of the distribution channels are separated for thermally isolating the channels and so that upon axial rotation of the mobile portions, material deposited from one nozzle is integrated with material deposited from the other nozzle. The resultant product is again clearly delineated and regular in structure.

U.S. Pat. No. 3,408,960 relates to variegated frozen comestibles such as ice cream and the like. A mechanism is provided which introduces continuous charges or streams of a contrasting fluent flavoring or other comestibles into a moving mass of semi-frozen ice cream in a manner so that the final product has a uniform pattern.

It can therefore be readily appreciated that although the disclosures detailed above are capable of distributing sauces throughout a product, the sauces are distributed in a regular form which conveys to the consumer that the products are mass-produced, machine-manufactured items. In contrast, it is the aim of the present invention to provide a frozen confection in which the sauce is distributed throughout the product in a random, unstructured fashion which is indicative of a more hand-crafted, artisanal, marbled product.

EP0221757 discusses an ice cream product containing chocolate and a method for producing the same in which chocolate flakes are contained inside the ice cream product so that complex patterns of intermittently arranged chocolate streaks are presented in any section appearing in biting of the product. In the process and apparatus disclosed, molten chocolate is ejected at a high speed towards ice cream issuing from a nozzle so that the chocolate penetrates the ice cream flowing from the nozzle such that thin strip-like chocolate layers are produced in the ice cream. However, this process and apparatus requires that chocolate is ejected at a high enough pressure to penetrate the ice cream.

As such, energy is expended in pressurising the chocolate which also requires heating to ensure it has a low enough viscosity to allow high pressure ejection. Moreover, the process requires ejection of chocolate towards an ice cream stream which is an inherently messy and uncontained processing step that can result in waste and issues of contamination within the factory environment. Finally, the process relies on gravity and pressure to combine the chocolate with the ice cream and is therefore only able to provide lateral and vertical mixing but cannot provide the turbulent or torsional mixing required to create the desired rippled, marbled product structure.

U.S. Pat. No. 3,014,437 specifically relates to an apparatus for variegating or marbleizing ice cream and is intended to introduce into ice creams ripples of differently coloured materials, including sauces. The apparatus has a lower chamber into which ice cream is admitted through an outlet. Below the outlet for the ice cream are further outlets for the differently coloured materials and the differently coloured materials are therefore capable of being forced as streams into the ice cream. The combined streams then pass into a static mixing chamber which contains a twister element which is rotated to cause the differently coloured materials to be randomly distributed through the ice cream to form the desired marbled effect. However, the speed of rotation of the twister must be made slow so as to cause a twisting of the variegated material without objectionable blending. For example, if a chocolate sauce is to be incorporated with vanilla ice cream, the twister element must be rotated at a low speed to obtain the desired randomly rippled, marbled product. If the twister element is rotating too quickly then the chocolate is mixed into the vanilla ice cream, effectively creating a brown, chocolate-flavoured ice cream with none of the structure that this invention provides. As such, the apparatus of U.S. Pat. No. 3,014,437 is unsuitable for modern factory-based manufacture because it cannot be operated at a high throughput.

There is therefore a need for an apparatus and process that is capable of manufacturing frozen confections which comprise sauces in a random, rippled manner which is indicative of a more artisanal, marbled, hand-made product. It is an object of this invention to provide such an apparatus and process.

It is also an object of this invention to provide an apparatus and process that can do this in an industrial scale for high-throughput manufacturing lines.

It is a further object of this invention to provide an apparatus and process that realises improvements in efficiency and energy consumption.

It is another object of this invention to provide an apparatus and process that operates without issues of blockage and moreover that can be used with a various frozen confections and sauces with a wide range of temperatures and of rheological properties such as flow-rate and viscosity.

SUMMARY OF INVENTION

We have now found that these objects can be achieved through the use of a specially configured apparatus. Accordingly, in a first aspect the present invention provides an apparatus for producing frozen confectionery products, the apparatus comprising
   a mixing chamber
   the mixing chamber having
      at least one frozen confection inlet connectable to a source of a frozen confection;
      at least one sauce inlet connectable to a source of sauce; and
      an outlet
      wherein the at least one sauce inlet is positioned between the at least one frozen confection inlet and the outlet,
characterised in that the mixing chamber is rotatable.

It has surprisingly been found that by constructing a rotatable mixing chamber that integrally comprises frozen confection and sauce inlets it is possible to provide sauce distributed throughout the frozen confection in a random, marbled fashion. Notably, because the mixing chamber integrally comprises the frozen confection and sauce inlets these inlets will necessarily rotate with the rest of the mixing chamber.

Preferably the apparatus comprises four, more preferably three, more preferably still two frozen confection inlets. Preferably the frozen confection inlets are arranged in a symmetrical fashion. In one embodiment, when a plurality of frozen confection inlets are provided they may be connected to more than one source of frozen confection to allow for a multi-flavoured product to be delivered. In an alternative embodiment, the frozen confection inlet or inlets are connected to the same source of frozen confection. Preferably the frozen confection is an ice cream.

Preferably the apparatus comprises a deflector positioned below the frozen confection inlet or inlets. Preferably the deflector is configured to deflect the frozen confection away from the rotational axis of the mixing chamber.

Preferably the apparatus comprises four, more preferably three, more preferably still two sauce inlets. In one embodiment, when a plurality of sauce inlets are provided they may be connected to more than one source of sauce to allow for a more complex product to be delivered. In an alternative embodiment, the sauce inlet or inlets are connected to the same source of sauce.

Preferably the sauce is a fat-based sauce such as chocolate, coverture, chocolate analogue, or the like. In an alternative embodiment the sauce is a water-based sauce such as a fruit sauce, compote, syrup or the like.

Preferably the frozen confection inlet or inlets are positioned at the top of the interior of the mixing chamber. Preferably the frozen confection inlet or inlets have a curved orifice.

Preferably the outlet is positioned at the bottom of the mixing chamber. Preferably the outlet is a circular orifice.

Preferably the sauce inlet or inlets are positioned towards the centre of the mixing chamber. In a preferred embodiment the sauce inlet or inlets are angled towards the rotational axis of the mixing chamber. In a further preferred embodiment the sauce inlet or inlets have an oval orifice.

Preferably the mixing chamber has a circular cross section and tapers towards the outlet. In a preferred embodiment the mixing chamber is frusto-conical. In a preferred embodiment the mixing chamber has an upper part with parallel walls adjoining a lower part that is frusto-conical.

Preferably the apparatus comprises outlet control means for opening and closing the outlet. In a preferred embodiment the outlet control means is a valve. In a further preferred embodiment the outlet control means is a plunger.

In a second aspect the invention provides a process for producing frozen confectionery products, the process comprising:
  providing an apparatus according to the first aspect of the invention;
  supplying a frozen confection to the at least one frozen confection inlet;
  supplying a sauce to the at least one sauce inlet; and
  extruding the frozen confection and sauce from the outlet, characterised in that the mixing chamber is rotated thereby to distribute the sauce randomly throughout the frozen confection.

Because the mixing chamber integrally comprises the frozen confection and sauce inlets these inlets will necessarily rotate when the mixing chamber is rotated.

Preferably the frozen confection is an ice cream.

Preferably the sauce is a fat-based sauce such as chocolate, coverture, chocolate analogue, or the like. In an alternative embodiment the sauce is a water-based sauce such as a fruit sauce, compote, syrup or the like.

Preferably the mixing chamber is rotated at a speed of at most 250 rpm, more preferably 200 rpm, more preferably still 175 rpm, most preferably 155 rpm. Preferably the mixing chamber is rotated at a speed of at least 75 rpm, more preferably 100 rpm, more preferably still 125 rpm, most preferably 145 rpm.

Preferably the frozen confection is supplied to the at least one frozen confection inlet at a flow rate of at most 250 kg/hour, more preferably 200 kg/hour, more preferably still 175 kg/hour, most preferably 155 kg/hour. Preferably the frozen confection is supplied to the at least one frozen confection inlet at a flow rate of at least 75 kg/hour, more preferably 100 kg/hour, more preferably still 125 kg/hour, most preferably 145 kg/hour.

Preferably the sauce is supplied to the at least one sauce inlet at a flow rate of at most 75 kg/hour, more preferably 60 kg/hour, more preferably still 50 kg/hour, most preferably 45 kg/hour. Preferably the sauce is supplied to the at least one sauce inlet at a flow rate of at least 10 kg/hour, more preferably 20 kg/hour, more preferably still 30 kg/hour, most preferably 40 kg/hour.

Preferably the frozen confection and sauce are extruded from the outlet at a flow rate of at most 325 kg/hour, more preferably 260 kg/hour, more preferably still 220 kg/hour, most preferably 200 kg/hour. Preferably frozen confection and sauce are extruded from the outlet at a flow rate of at least 85 kg/hour, more preferably 120 kg/hour, more preferably still 155 kg/hour, most preferably 185 kg/hour.

BRIEF DESCRIPTION OF THE DRAWINGS

The invention will be further described with reference to the figures wherein.

DETAILED DESCRIPTION OF INVENTION

It is an object of this invention to provide a product which comprises a frozen confection and a sauce in which the sauce is incorporated throughout the frozen confection in a random, rippled manner which is indicative of an artisanal, marbled, hand-made product. The careful, manual combining together of a frozen confection with a sauce, for example an ice cream with a chocolate sauce, can be used to incorporate the sauce in such a random, artisanal manner. The combined products can then be scooped carefully into a container, but these manual processes are time consuming and inappropriate for industrial ice cream manufacture. They are also only suitable for scooping and so when a cone is used the frozen confection will not be present throughout the body of the product. Moreover, it is difficult to ensure that the sauce and the frozen confection are combined rapidly and randomly yet will remain separate to provide a heterogeneous product, as opposed to being blended together to form a homogenous mix.

As set out above, U.S. Pat. No. 3,014,437 relates to an apparatus for variegating or marbleizing ice cream and is intended to introduce ripples of differently coloured materials, including sauces, into ice creams. The apparatus has a chamber into which ice cream is admitted through an outlet. Below the outlet for the ice cream are further outlets for the differently coloured materials and the differently coloured materials are therefore capable of being forced as streams into the ice cream. The combined streams then pass into a mixing chamber which contains a twister element which is rotated to cause the differently coloured materials to be randomly distributed through the ice cream to form the desired marbled effect. The mixing chamber itself remains static. In U.S. Pat. No. 3,014,437 the speed of rotation of the twister must be made slow to prevent blending and therefore the rate at which products can be produced is limited by this issue.

We have now found that a frozen confection that contains one or more sauces in the form of random structures within the body of the product can be rapidly produced on an industrial scale through the use of the apparatus of this invention. The apparatus comprises a mixing chamber into which a frozen confection and a sauce are introduced by means of separate inlets. When oriented for use, the apparatus will dispense the product vertically downwards into an awaiting receptacle and in this orientation the frozen confection inlet or inlets are at the top of the mixing chamber, the outlet is at the bottom of the mixing chamber, and the sauce inlet or inlets are positioned between the frozen confection inlet(s) and the outlet. This configuration allows the frozen confection to be introduced into the mixing chamber via the upper part, substantially filling the chamber when the outlet is closed, and as such the sauce inlet(s) are positioned within the frozen confection when the mixing chamber is filled. As a consequence, when the sauce is introduced into the mixing chamber it is introduced into the frozen confection itself. However, this configuration is not sufficient to achieve the desired distribution of the sauce throughout the frozen confection. The present invention has surprisingly found that if the mixing chamber can be rotated during filling then the sauce can be randomly distributed. As a consequence, in the apparatus of the invention the entire mixing chamber, including the frozen confection and sauce inlets, can be rotated such that when the different components are introduced into the mixing chamber the rotational movement causes specific mixing vortices within the chamber that ensure that the sauce is layered within the frozen convection in an heterogenous fashion but without any noticeable blending taking place.

The apparatus may function with various different numbers of frozen confection inlets but in preferred embodiments the apparatus comprises four, or three, or two frozen confection inlets positioned at the top of the mixing chamber. As will be appreciated, when oriented for use, the mixing chamber will have an axis of rotation that passes vertically downwards through the centre of the apparatus. In a further preferred embodiment the frozen confection inlets are located equidistantly around this axis of rotation, preferably in a symmetrical fashion—for example: If there are two frozen confection inlets they will be positioned opposite one another; If there are three frozen confection inlets they will be positioned at 120° from each other; If there are four frozen confection inlets they will be positioned at 90° from each other; and so on. In a preferred embodiment the frozen confection inlet or inlets are positioned at the top of the mixing chamber. In a further preferred embodiment, the frozen confection inlet or inlets have a curved orifice which corresponds to the curved shape of the walls of the mixing chamber.

In order to introduce the frozen confection into the mixing chamber the inlets are connectable to a source of frozen confection. The term "frozen confection" means a sweet-tasting fabricated foodstuff in the frozen state (i.e. under conditions wherein the temperature of the foodstuff is less than 0° C., and preferably under conditions wherein the foodstuff comprises significant amounts of ice). Frozen confections include ice cream, water ice, sorbet, sherbet, frozen yoghurt and the like. In the present invention ice cream or yoghurt are preferred frozen confections but other suitable frozen confections are any such confections which can be pumped into and extruded from the mixing chamber at the operating temperatures.

Frozen confections may be aerated or unaerated. By unaerated is meant an overrun of less than 20%, preferably less than 10%. An unaerated frozen confection is not subjected to deliberate steps such as whipping to increase the gas content. Nonetheless, it will be appreciated that during the preparation of unaerated frozen confections, low levels of gas, such as air, may be incorporated in the product. Aerated frozen confections have an overrun of more than 20%, preferably more than 50%, more preferably more than 75%. Preferably the frozen confection has an overrun of less than 200%, more preferably less than 150%, most preferably less than 120%. Overrun is measured at atmospheric pressure and is defined by the equation:

$$\text{Overrun (\%)} = ((\text{density of mix} - \text{density of frozen confection})/\text{density of frozen confection}) \times 100.$$

Frozen confections may be manufactured by any suitable process, typically by preparing a mix of ingredients; then pasteurising and optionally homogenising the mix; and then freezing and optionally aerating the mix to produce the frozen confection.

In order to simplify the structure of the apparatus the frozen confection inlets are typically connected to the same source of frozen confection. However, in another embodiment of the apparatus, when more than one frozen confection inlet is provided the inlets can be connected to more than one source of frozen confection to allow for a multi-flavoured product to be delivered. For example, one inlet could provide a vanilla ice cream and the other could provide a chocolate ice cream.

The apparatus may comprise a deflector positioned below the frozen confection inlet or inlets. This deflector serves to create turbulence in the frozen confection as it enters the mixing chamber and has been found to further improve the desired structure of the product. In one embodiment the deflector is configured to deflect the frozen confection away from the rotational axis of the mixing chamber, i.e. as the frozen confection exits the inlet it at least partly interacts with the deflector and its path is deflected away from the downwards trajectory and towards the outer walls of the mixing chamber.

The apparatus may also function with various different numbers of sauce inlets but in preferred embodiments the apparatus comprises four, or three, or two sauce inlets positioned between the frozen confection inlet(s) and the outlet. Due to this positioning, when the sauce is introduced into the mixing chamber it is introduced into the body of the frozen confection itself. In an embodiment comprising a deflector, the sauce inlet(s) are positioned below the deflector. In a further preferred embodiment the sauce inlets are located equidistantly around the axis of rotation, preferably in a symmetrical fashion for example: If there are two sauce inlets they will be positioned opposite one another; If there are three sauce inlets they will be positioned at 120° from each other; If there are four sauce inlets they will be positioned at 90° from each other; and so on.

In one embodiment, the sauce inlet(s) may be directed vertically downwards into the mixing chamber. It has been further found that an improved product structure is obtained if the sauce is directed towards the centre of the mixing chamber, preferably towards the rotational axis and so in a preferred embodiment the sauce inlet(s) are angled towards the towards the centre of the mixing chamber, preferably towards the rotational axis. This angling may be achieved by either angling the whole inlets(s), providing inlets which curve from a vertical to an angled orientation, or providing inlets which bend to form a corner from a vertical to an angled section.

The opening of the sauce inlet(s) can be of any suitable shape such as rectangular, square or circular. In a preferred embodiment the opening is oval.

The sauce can be of various different types such a fat-based sauces, examples of which include chocolate, coverture, chocolate analogue, or the like. In an alternative the sauce may be a water-based sauce, examples of which include fruit sauces, compotes, syrups, or the like.

Due to the need to rotate the apparatus, the mixing chamber preferably has a circular cross section and tapers towards the outlet to form a frusto-conical chamber. In a further preferred embodiment the mixing chamber has an upper part with parallel walls adjoining a lower part that is frusto-conical.

The product is dispensed via the outlet and the apparatus further comprises outlet control means for opening and closing the outlet. When closed, the outlet control means allow the frozen confection and sauce to fill the mixing chamber while rotating. Once filled, the outlet control means are opened to allow the product to be dispensed from the outlet. Various outlet control means are suitable but in a preferred embodiment the outlet control means is a valve. In a further preferred embodiment the outlet control means is a plunger.

In a second aspect the invention provides a process for producing frozen confectionery products, the process comprising:
  providing an apparatus according to the first aspect of the invention;
  supplying a frozen confection to the at least one frozen confection inlet;
  supplying a sauce to the at least one sauce inlet; and
  extruding the frozen confection and sauce from the outlet, characterised in that the mixing chamber is rotated thereby to distribute the sauce randomly throughout the frozen confection.

In use on an industrial manufacturing line the mixing chamber is continually rotating. The mixing chamber can be rotated at various speeds in order to achieve the appropriate product structure but in a preferred embodiment the mixing chamber is rotated at a speed of from 75 to 250 rpm. The proportions of frozen confection and sauce can be easily varied by varying the flow rates of these components into the mixing chamber through the relevant inlets. In a preferred embodiment the frozen confection is supplied at a flow rate of from 75 to 250 kg/hour and the sauce is supplied at a flow rate of from 10 to 75 kg/hour. The frozen confection and sauce are therefore provided under pressure to the mixing chamber.

While the outlet control means is closed the frozen confection and sauce are mixed through the action of the turbulent vortices created by the rotation of the mixing chamber as opposed to by mechanical turbulence caused by, for example, any rotating element within the mixing chamber. The pressure of the supply of the frozen confection and sauce is such that when the mixing chamber is filled the introduction of further frozen confection and sauce to the chamber is temporarily halted as the pressure in the chamber raises to the point where it is equilibrated to the pressure of the supply at the inlets. When the outlet control means is opened, the action of gravity, the positive pressure built up in the mixing chamber, and the pressure exerted by the introduction of further frozen confection and sauce to the mixing chamber serves to extrude the product out of the chamber via the outlet into an awaiting receptacle.

Once the product has been extruded the outlet is closed and due to the positive pressure at the inlets more frozen confection and sauce is introduced into the chamber as it continues to rotate. The chamber fills once more, the components mix, a new receptacle is positioned beneath the outlet, and then the next product is dispensed. The filled receptacles are then transferred to blast freezers for hardening.

The invention will now be described in further detail with reference to the drawings which show a preferred embodiment of the apparatus.

Figure 1:
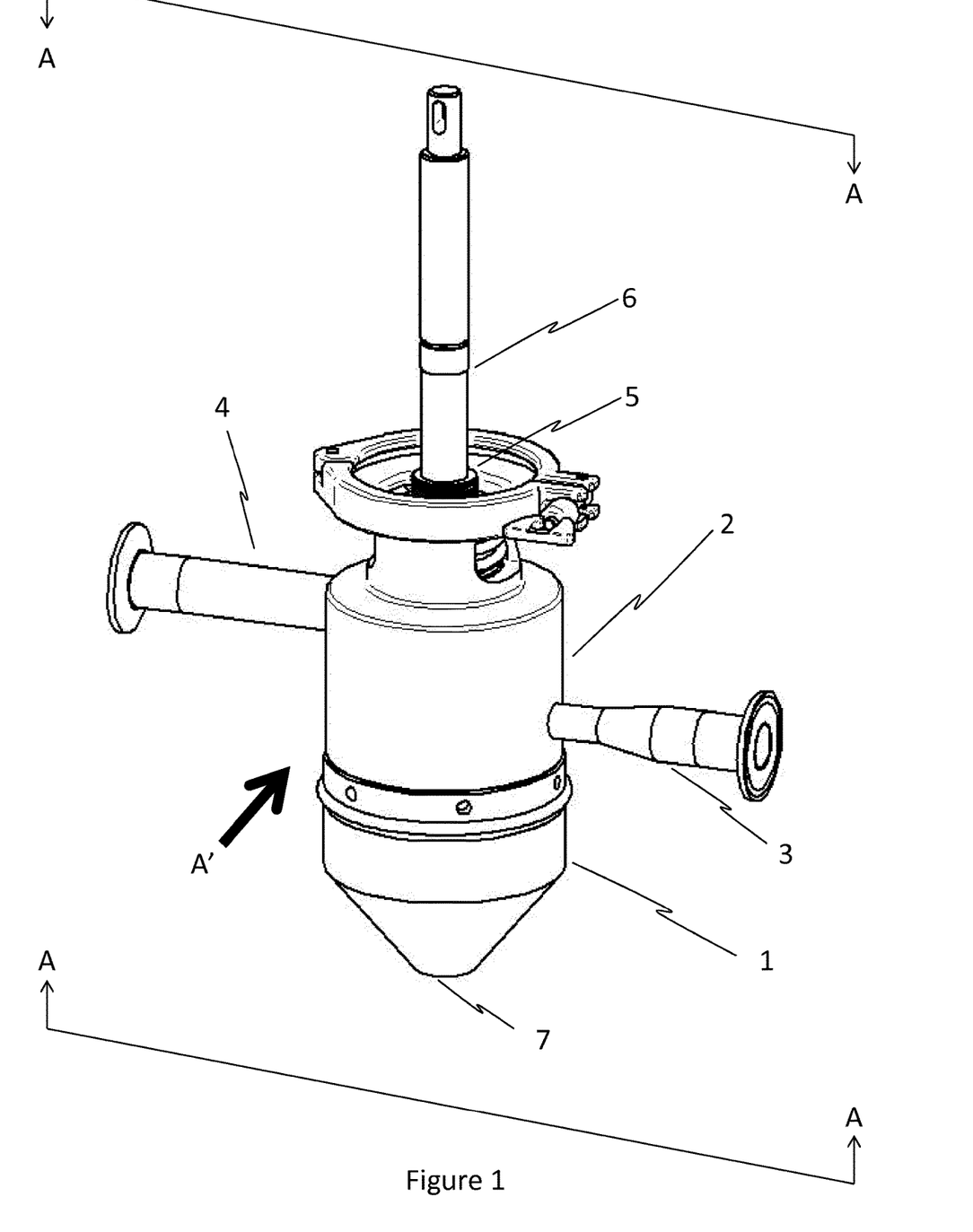
FIG. 1 shows one embodiment of the apparatus of the invention.

FIG. 1 is external view of the apparatus of the invention showing the external surfaces of the mixing chamber 1 and a manifold 2 which has connectors for the sauce 3 and the frozen confection 4 which are connectable with the sources of these materials. FIG. 1 further shows a drive connector 5 which rotates the mixing chamber 1 and an outlet control means 6 which in this embodiment is a plunger which passes through the centre of the drive connector 5 to interface with the outlet 7 of the mixing chamber 1. In operation, the drive connector 5 is connected via a suitable pick up means such as a belt or chain to a drive means such as an electric motor. This structure therefore causes the drive connector 5, and therefore the mixing chamber 1, to rotate. The outlet control means 6 is connected to a suitable movement means which acts to raise and lower this element to open and close the outlet 7. As discussed above, frozen confection is provided from a source of a frozen confection which is pumped into the mixing chamber via the connector for the frozen confection 4. Similarly, sauce is provided from a source of a sauce which is pumped into the mixing chamber via the connector for the sauce 3.

Figure 2:
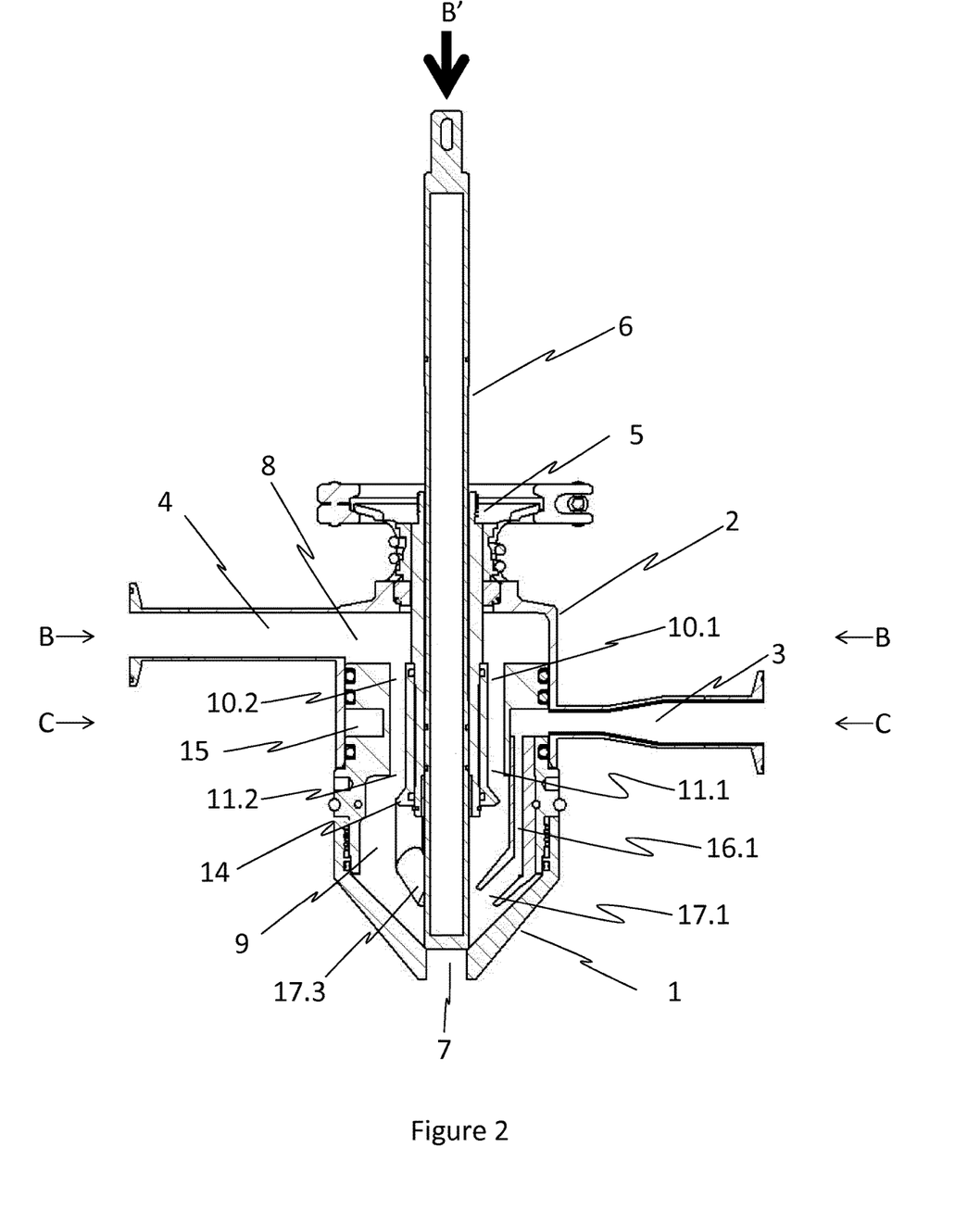
FIG. 2 shows the apparatus of FIG. 1 in vertical cross section.

FIG. 2 shows the apparatus of FIG. 1 in cross section along the plane indicated by lines A-A in FIG. 1 and viewed in the direction of arrow A' in FIG. 1. As can be seen, the connector for the frozen confection 4 feeds into an upper frozen confection chamber 8 the top and sides of which are formed by the walls of the manifold 2 and the base of which is formed by the upper part of the mixing chamber 1. This upper frozen confection chamber 8 connects to the interior 9 of the mixing chamber 1 via a first 10.1 and second 10.2 frozen confection passage and the frozen confection therefore enters the interior 9 of the mixing chamber 1 via the frozen confection inlets 11.1 and 11.2 located at the top of the chamber 9. FIG. 2 also shows an example of the deflector 14.

The connector for the sauce 3 feeds into an annular sauce chamber 15 the external wall of which is formed from the wall of the manifold 2 and the internal wall and upper and lower surfaces are formed from the internal structure of mixing chamber. This annular sauce chamber 15 connects to the interior 9 of the mixing chamber 1 via three sauce passages the first of which is indicated as element 16.1. The second sauce passage 16.2 is not shown as it is present in the part of the apparatus that has been cut away for the purposes of this cross sectional representation. The third sauce passage 16.3 also cannot be seen in this figure as it is present in the body of the section shown in this cross sectional representation. Two of the sauce inlets can be seen in FIG. 2 at 17.1 (inlet of first sauce passage) and 17.3 (inlet of third sauce passage). As set out above, the sauce inlets are directed towards the rotational axis of the mixing chamber by bending to form a corner between a vertical and an angled section.

In FIG. 2 the outlet 7 is in a closed state caused by the outlet control means 6 being in a lowered position to interface with and block outlet 7.

Figure 3:
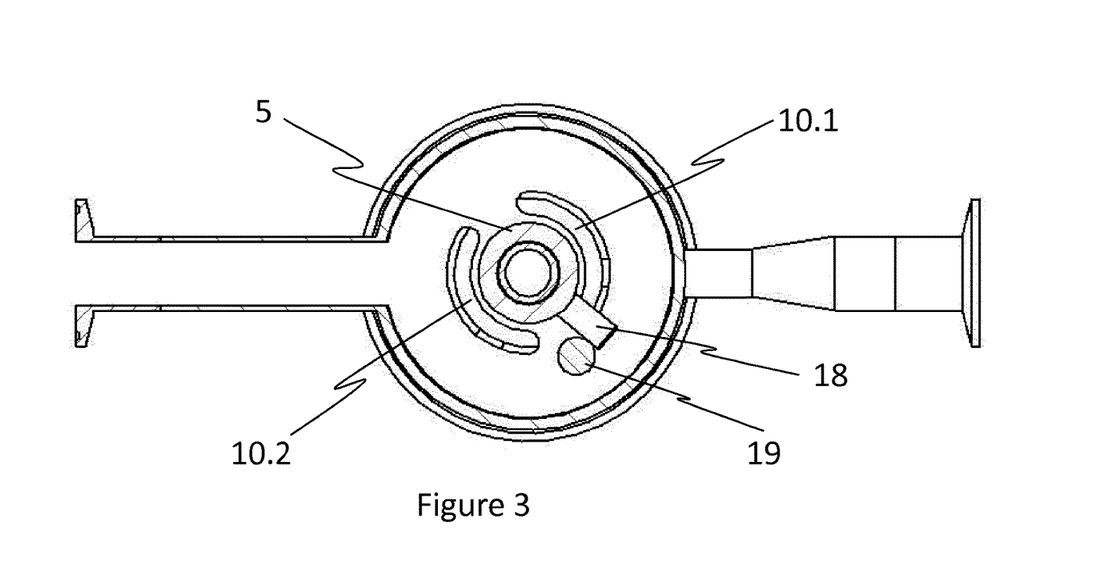
FIG. 3 shows the apparatus of FIG. 1 in horizontal cross section along the plane of a frozen confection connector.

FIG. 3 represents the apparatus of FIG. 2 in cross section along the plane indicated by the arrows labelled B and viewed from above as indicated by arrow B' in FIG. 2. FIG. 3 shows that the frozen confection passages 10.1 and 10.2 are positioned opposite one another and therefore are located equidistantly around the axis of rotation, in a symmetrical fashion.

FIG. 3 also shows how the drive connector 5 may interface with the mixing chamber 1 to rotate the chamber 1. In this embodiment the drive connector 5 has a lug 18 which interfaces with a pin 19 on the top of the mixing chamber 1. Therefore, when the drive connector 5 is rotated (by a suitable pick up means such as a belt or chain connected to a drive means such as an electric motor) lug 18 pushes against the pin 19 to spin the mixing chamber 1. In this embodiment, the manifold 2 also serves as a frame for the chamber 1 to rotate within. The internal surface of the manifold 2 has annular ridges which interface with corresponding annular grooves on the external surface of the chamber 1 to hold the chamber 1 in place while also allowing it to spin.

Figure 4:
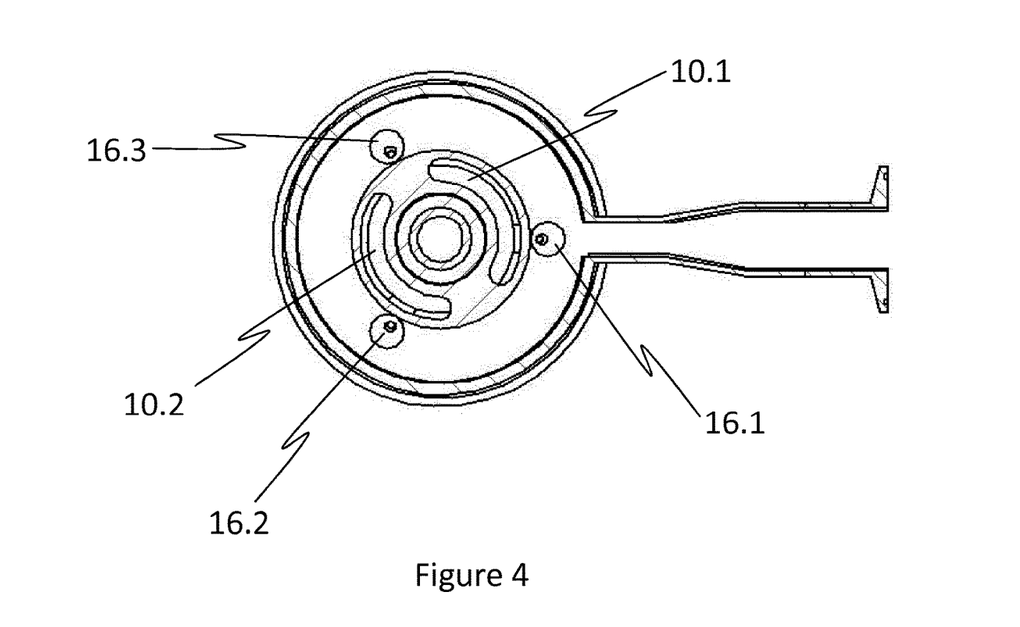
FIG. 4 shows the apparatus of FIG. 1 in horizontal cross section along the plane of a sauce connector.

FIG. 4 represents the apparatus of FIG. 2 in cross section along plane indicated by line the arrows labelled C and viewed from above as indicated by arrow B' in FIG. 2. FIG. 4 shows that the sauce passages 16.1, 16.2 and 16.3 are located equidistantly around the axis of rotation in a symmetrical fashion positioned and an angle of 120° relative to one another.

Figure 5:
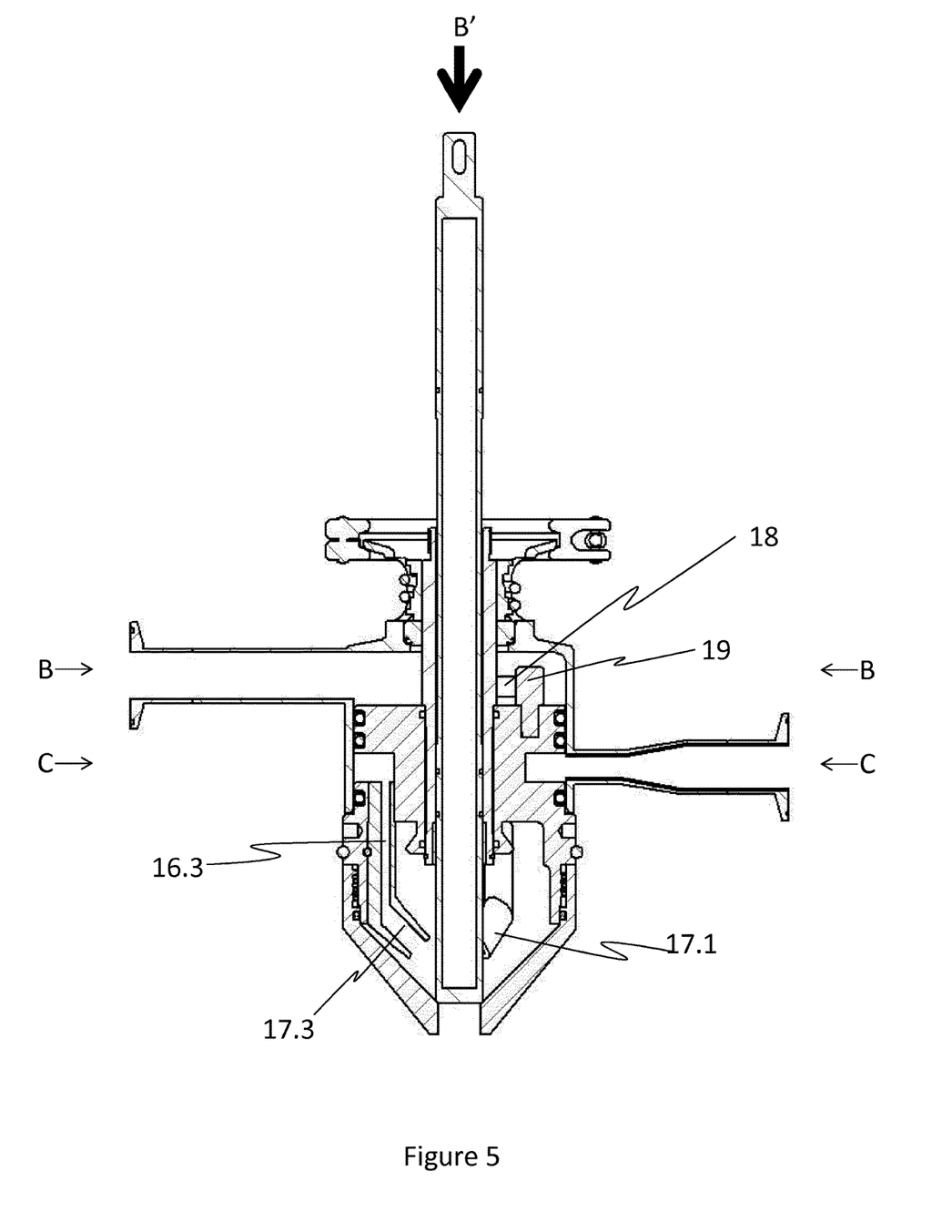
FIG. 5 shows the apparatus of FIG. 2 wherein the mixing chamber has been rotated 300°.

In order to further demonstrate how the mixing chamber rotates, FIG. 5 is provided which shows the apparatus of FIG. 3 but where the mixing chamber 1 has been undergone an almost complete clockwise (as viewed from above as indicated by arrow B') rotation of 300°. In this figure, it can be seen that as the mixing chamber has rotated, the frozen confection passages 10.1 and 10.2 (and therefore frozen confection inlets 11.1 and 11.2) and the sauce passages 16.1, 16.2, and 16.3 (and therefore sauce inlets 17.1, 17.2, and 17.3) have all also rotated by 300°. As a consequence, frozen confection passages 10.1 and 10.2 and frozen confection inlets 11.1 and 11.2 are not visible in this cross sectional representation but the third sauce passage 16.3 and inlet 17.3 are now visible, along with first sauce inlet 17.1. FIG. 5 also shows how the lug 18 has pushed against pin 19 to rotate the mixing chamber 1.

Figure 6:
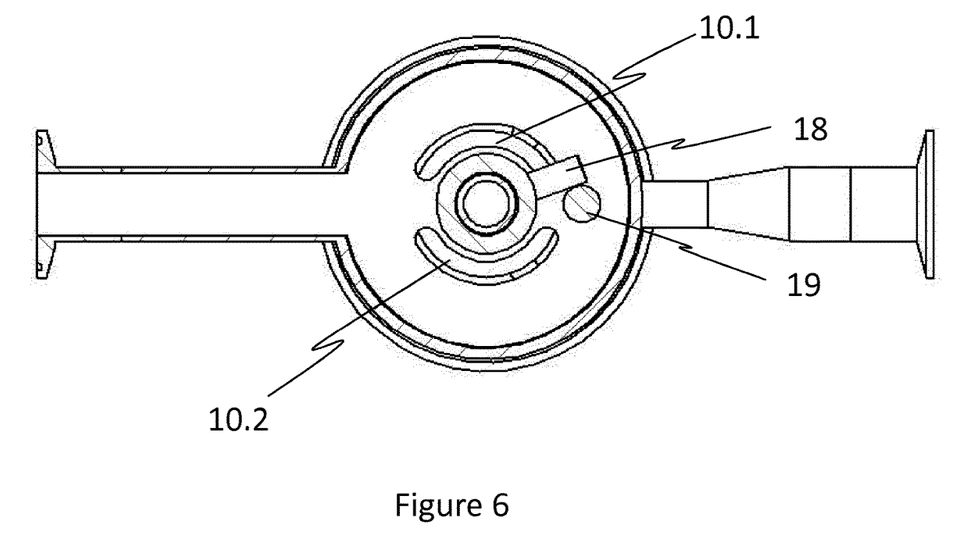
FIG. 6 shows the apparatus of FIG. 3 wherein the mixing chamber has been rotated 300°.

FIG. 6 represents the apparatus of FIG. 5 in cross section along the plane indicated by the arrows labelled B and viewed from above as indicated by arrow B' in FIG. 5. FIG. 6 shows how the frozen confection passages 10.1 and 10.2 have rotated through 300° and also show how the drive connector 5 has interfaced (via lug 18 and pin 19) with the mixing chamber 1 to rotate the chamber.

Figure 7:
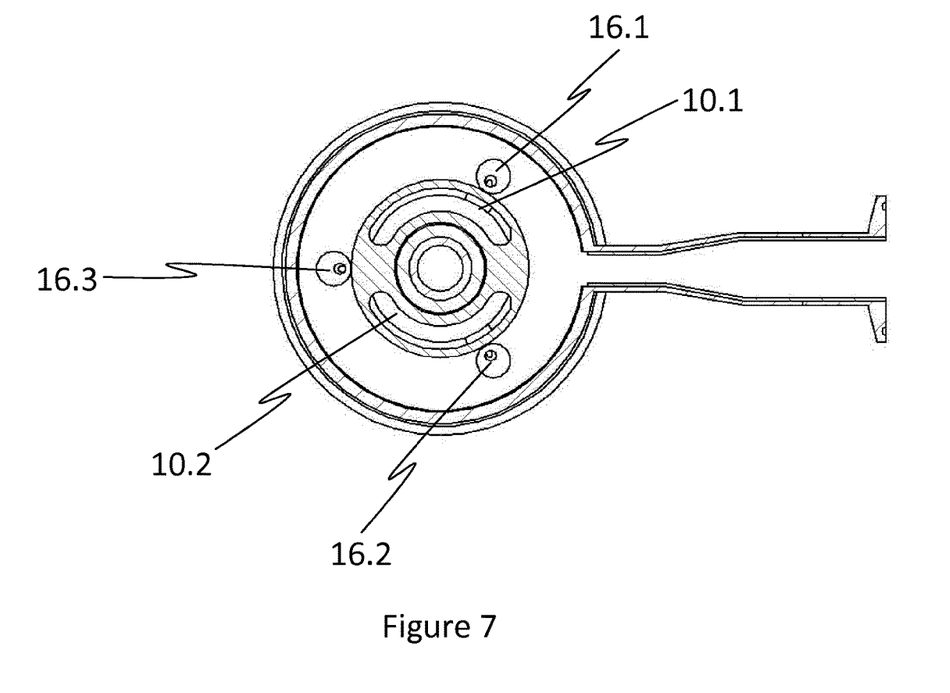
FIG. 7 shows the apparatus of FIG. 4 wherein the mixing chamber has been rotated 300°.

FIG. 7 represents the apparatus of FIG. 5 in cross section along plane indicated by line the arrows labelled C and viewed from above as indicated by arrow B' in FIG. 5. FIG. 7 shows that the sauce passages 16.1, 16.3 and 16.3 have also rotated through 300°.

The apparatus shown in FIGS. 1-7 is operated as follows.

The drive connector 5 was linked to an electric motor via a chain and the motor was operated to cause the drive connector 5 to spin at 150 rpm. The rotation of the drive connector 5 was transferred to the mixing chamber 1 via lug 18 and pin 19. The annular grooves of the mixing chamber 1 were seated in the annular ridges of the manifold 2 and therefore mixing chamber 1 also rotated at 150 rpm.

Ice cream was pumped from a holding tank at a temperature of −4° C. via the connector for the frozen confection 4 at a rate of 152 kg/hour. The ice cream therefore entered the upper frozen confection chamber 8 and passed down frozen confection passages 10.1 and 10.2 and entered the interior 9 of the mixing chamber 1 via the frozen confection inlets 11.1 and 11.2 located at the top of the chamber 9. As the frozen confection exited the frozen confection inlets 11.1 and 11.2 it at least partly interacted with deflector 14 which deflected the ice cream away from its downwards trajectory and towards the outer walls of the mixing chamber 9.

Molten chocolate, at a temperature of 35° C., was pumped from another holding tank via the connector for the sauce 3 at a rate of 43.5 kg/hour. The chocolate therefore entered the annular sauce chamber 15 and passed down sauce passages 16.1, 16.2 and 16.3 and entered the interior 9 of the mixing chamber 1 via the sauce inlets 17.1, 17.2 and 17.3 into the ice cream in the mixing chamber 1.

Figure 8:
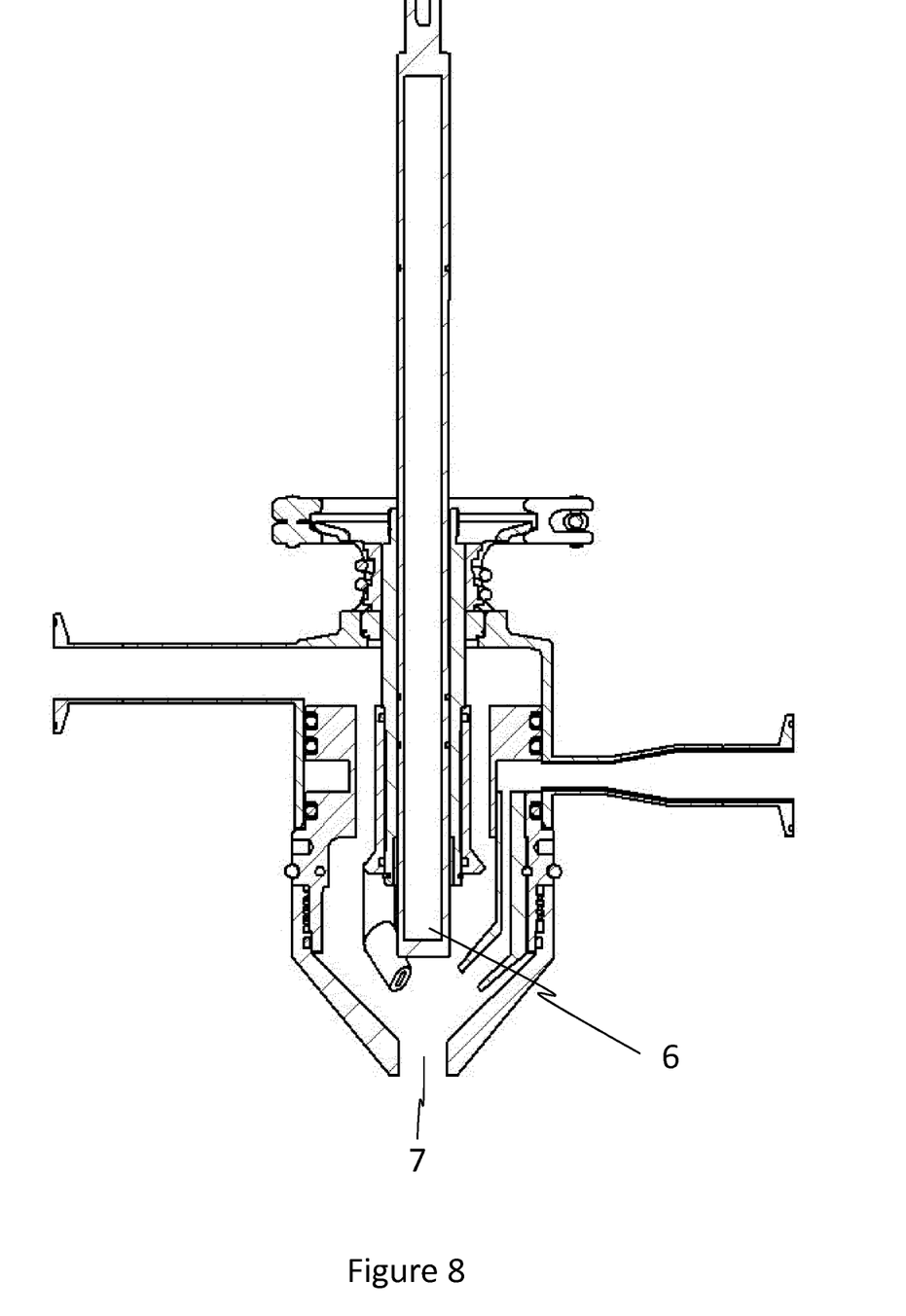
FIG. 8 shows the apparatus of FIG. 2 wherein the outlet is in the open position.

The outlet 7 was in the closed position due to the plunger 6 being in a lowered position. In this configuration the chocolate was distributed through the ice cream in the desired random, marbled structure due to the turbulence created by the rotation of the mixing chamber 1. Once the interior of the chamber 9 had filled with ice cream and chocolate the pressure in the chamber was such that the introduction of further ice cream and chocolate was halted because the pressure inside the chamber interior 9 had equilibrated to the pressure of the supply at the inlets. When the outlet control 6 was raised, the outlet 7 opened (as shown in FIG. 8) and the product was extruded into an awaiting cone at a flow rate of 195.5 kg/hour.

Figure 9:
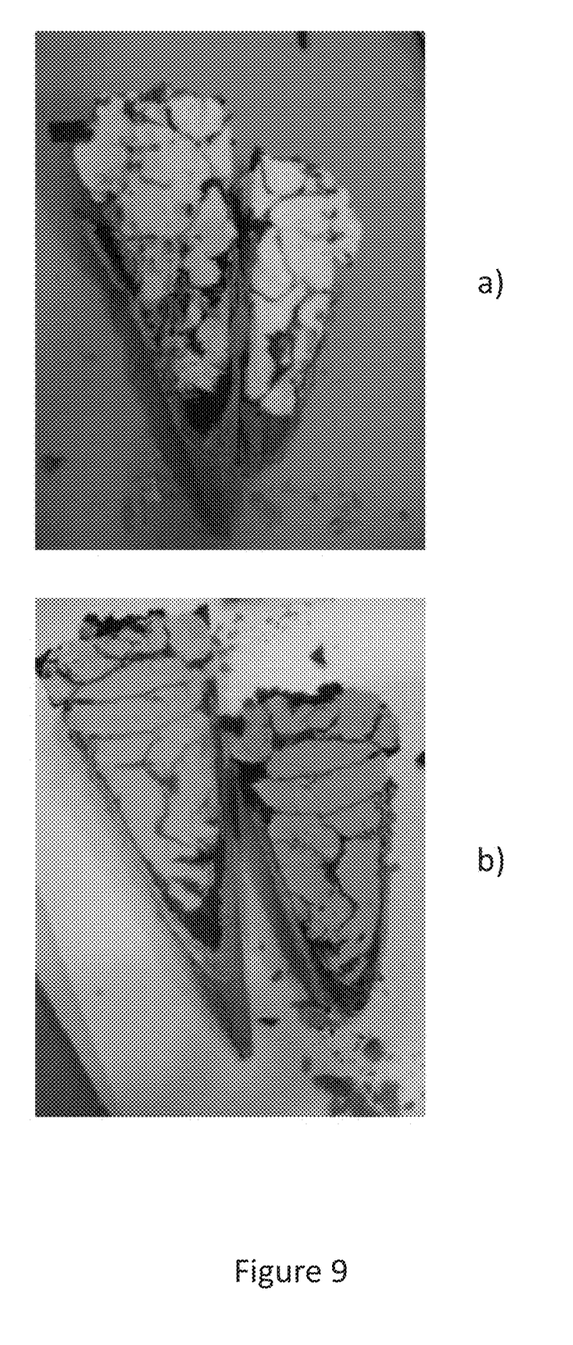
FIG. 9 shows examples of products produced by the apparatus and process of the present invention.

Outlet 7 was then closed and more ice cream and chocolate were introduced into the chamber which was continuing to rotate at 150 rpm. The chamber therefore filed once more, the components were mixed, a new cone was positioned beneath the outlet, and the next product was dispensed. In this way it was possible to produce 55 products per minute, a rate of almost one product per second. Typical products produced by the apparatus and process of the present invention are shown in FIGS. 9a which shows a product of vanilla ice cream with a chocolate sauce and 9b which shows a product of chocolate cream with a chocolate sauce. In these images it can be readily seen that throughout the ice cream the chocolate has been incorporated in a random, rippled manner which is indicative of a more artisanal, marbled, hand-made product.

The invention claimed is:

1. An apparatus for producing frozen confectionery products, the apparatus comprising
a mixing chamber,
the mixing chamber having
at least one frozen confection inlet connectable to a source of a frozen confection;
at least one sauce inlet connectable to a source of sauce; and
an outlet
wherein the at least one sauce inlet is positioned between the at least one frozen confection inlet and the outlet,
characterised in that the mixing chamber is rotatable.

2. An apparatus according to claim 1 comprising two frozen confection inlets.

3. An apparatus according to claim 1 comprising a deflector between the least one frozen confection inlet and the at least one sauce inlet.

4. An apparatus according to claim 1 comprising three sauce inlets.

5. An apparatus according to claim 1 wherein the at least one frozen confection inlet is positioned at the top of the interior of the mixing chamber.

6. An apparatus according to claim 1 wherein the at least one sauce inlet is angled towards the rotational axis of the mixing chamber.

7. An apparatus according to claim 1 wherein the mixing chamber has a circular cross section and tapers towards the outlet.

8. An apparatus according to claim 1 wherein the mixing chamber has an upper part with parallel walls adjoining a lower part that is frusto-conical.

9. A process for producing frozen confectionery products, the process comprising:
   providing an apparatus according to claim 1;
   supplying a frozen confection to the at least one frozen confection inlet;
   supplying a sauce to the at least one sauce inlet; and
   extruding the frozen confection and sauce from the outlet, characterised in that the mixing chamber is rotated thereby to distribute the sauce randomly throughout the frozen confection.

10. A process according to claim 9 wherein the frozen confection is an ice cream.

11. A process according to claim 9 wherein the sauce is a fat-based sauce.

12. A process according to claim 9 wherein the sauce is a water-based sauce.

13. A process according to claim 9 wherein the mixing chamber is rotated at a speed of from 75 to 250 rpm.

14. A process according to claim 9 wherein the frozen confection is supplied to the at least one frozen confection inlet at a flow rate of from 75 to 250 kg/hour.

15. A process according to claim 9 wherein the sauce is supplied to the at least one sauce inlet at a flow rate of at from 10 to 75 kg/hour.

* * * * *